US011072418B2

(12) United States Patent
Fox et al.

(10) Patent No.: US 11,072,418 B2
(45) Date of Patent: Jul. 27, 2021

(54) HYDRAULIC SYSTEM FOR AN AIRCRAFT

(71) Applicant: The Boeing Company, Chicago, IL (US)

(72) Inventors: Michael Thomas Fox, Saint Charles, MO (US); Eric Anton Howell, Ballwin, MO (US); Jeffrey M. Roach, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 733 days.

(21) Appl. No.: 15/952,767

(22) Filed: Apr. 13, 2018

(65) Prior Publication Data
US 2019/0315456 A1 Oct. 17, 2019

(51) Int. Cl.
*B64C 13/40* (2006.01)
*F15B 1/02* (2006.01)
*F15B 1/26* (2006.01)
*F15B 13/04* (2006.01)
*F04B 1/146* (2020.01)
*F04B 49/08* (2006.01)

(52) U.S. Cl.
CPC .............. *B64C 13/40* (2013.01); *F15B 1/02* (2013.01); *F15B 1/26* (2013.01); *F15B 13/0416* (2013.01); *F04B 1/146* (2013.01); *F04B 49/08* (2013.01)

(58) Field of Classification Search
CPC .... B64C 13/40; F15B 1/02; F15B 1/26; F15B 13/0416; F15B 15/063; F15B 11/17; F15B 20/004; F04B 1/146
See application file for complete search history.

(56) References Cited

U.S. PATENT DOCUMENTS

| | | | |
|---|---|---|---|
| 2,660,028 | A | 11/1953 | Geyer |
| 2,679,827 | A | 6/1954 | Perdue |
| 3,253,613 | A | 5/1966 | Richolt |
| 3,585,902 | A | 6/1971 | Anderson |
| 4,932,311 | A | 6/1990 | Mibu et al. |

(Continued)

FOREIGN PATENT DOCUMENTS

| | | |
|---|---|---|
| DE | 102007029358 A1 | 1/2009 |
| EP | 1500825 A2 | 1/2005 |

(Continued)

OTHER PUBLICATIONS

Freescale Semiconductor, Inc., "M68HC08 Microcontrollers, High Data Rate Wireless USB Optical Mouse Solution Using the MC68HC908QY4 and MC68HC908JB12," Designer Reference Manual, DRM055/D, Jan. 1, 2004, Motorola, pp. 1-44.

(Continued)

*Primary Examiner* — Valentina Xavier
(74) *Attorney, Agent, or Firm* — Coats & Bennett, PLLC

(57) ABSTRACT

A hydraulic system for an aircraft. The hydraulic system can include a hydraulic actuator that is operatively coupled to a flight control member. Hydraulic fluid is moved through the hydraulic system by an engine driven pump that delivers hydraulic fluid to the actuator at a first pressure, and a boost pump that delivers hydraulic fluid to the actuator at a second pressure that is higher than the first pressure. The hydraulic system is configured such that the hydraulic fluid returning from the actuator to the engine driven pump can be delivered to the boost pump prior to reaching the engine driven pump.

20 Claims, 13 Drawing Sheets

(56) References Cited

U.S. PATENT DOCUMENTS

| | | | |
|---|---|---|---|
| 5,074,495 A | 12/1991 | Raymond | |
| 5,144,851 A | 9/1992 | Grimm et al. | |
| 5,937,646 A * | 8/1999 | Zakula | F15B 11/17 60/430 |
| 6,352,018 B1 | 3/2002 | Krisher | |
| 6,578,425 B2 | 6/2003 | Hickman | |
| 7,059,563 B2 | 6/2006 | Huynh | |
| 8,109,163 B2 | 2/2012 | Hudson et al. | |
| 8,359,851 B2 | 1/2013 | Haase | |
| 8,418,956 B2 | 4/2013 | Fukui | |
| 8,499,552 B2 | 8/2013 | Kauss et al. | |
| 9,334,914 B2 | 5/2016 | Gartner | |
| 9,618,102 B2 | 4/2017 | Hirai | |
| 9,709,052 B1 | 7/2017 | Tanju et al. | |
| 9,823,670 B2 | 11/2017 | Wilson et al. | |
| 9,969,233 B2 | 5/2018 | Leglize | |
| 9,994,304 B2 | 6/2018 | Ito | |
| 10,384,764 B2 | 8/2019 | Blanc et al. | |
| 2007/0194738 A1 | 8/2007 | Hirai | |
| 2014/0023523 A1 * | 1/2014 | Berg | E02F 9/2253 417/53 |
| 2015/0059325 A1 | 3/2015 | Knussman et al. | |
| 2015/0114151 A1 | 4/2015 | Hirai | |
| 2016/0091004 A1 * | 3/2016 | Gomm | F15B 11/10 60/327 |
| 2016/0096617 A1 | 4/2016 | Ito | |
| 2017/0159678 A1 * | 6/2017 | Peterson | E02F 9/2217 |
| 2017/0233064 A1 | 8/2017 | McCormick et al. | |
| 2017/0335916 A1 | 11/2017 | Fox | |
| 2018/0128359 A1 | 5/2018 | Fida | |
| 2018/0135716 A1 | 5/2018 | Fox et al. | |
| 2018/0135717 A1 | 5/2018 | Fox et al. | |
| 2018/0156293 A1 | 6/2018 | Fox et al. | |

FOREIGN PATENT DOCUMENTS

| | | |
|---|---|---|
| EP | 1710446 A2 | 10/2006 |
| EP | 3067252 A1 | 9/2016 |

OTHER PUBLICATIONS

Avago Technologies, "Optical Mouse Sensors," AV00-0115EN, May 14, 2007, pp. 1-24.

European Search Report dated Sep. 6, 2019 in re EP application No. 19169010.6 filed Apr. 12, 2019.

European Search Report dated Sep. 3, 2019 in re EP application No. 19167685.7 filed Apr. 5, 2019.

* cited by examiner

HYDRAULIC SYSTEM FOR AN AIRCRAFT

BACKGROUND

Aircraft include one or more movable flight control members such as ailerons on the wings for roll control, elevators on the horizontal tail of the empennage for pitch control, a rudder on the vertical tail of the empennage for yaw control, and various other movable control surfaces. Movement of the flight control member is typically effected by one or more actuators mechanically coupled between a base (e.g., a wing spar) and the flight control member. In many aircraft, the actuators for flight control members are linear hydraulic actuators driven by a hydraulic system.

Hydraulic systems for aircraft can be designed to provide hydraulic fluid to the hydraulic actuators to move and position the flight control members as necessary during the flight of the aircraft. The hydraulic systems can include a series of supply and return lines. One or more actuators are positioned along the supply and return lines and are attached to the flight control members. A pump moves the hydraulic fluid through the supply and to the actuators. The hydraulic fluid than is directed into different sections of the actuator to move the actuator and thus adjust the flight control member. The hydraulic fluid from the actuator is moved into the return line which returns the hydraulic fluid to the pump to be reused in the hydraulic system.

During flight, potentially large forces can be applied to the flight control members. The actuators are required to apply the force to move the flight control members as necessary to maintain the flight of the aircraft. The hydraulic system should be configured to supply the necessary pressurized hydraulic fluid to the actuators to allow for this movement.

SUMMARY

One aspect is directed to a hydraulic system for an aircraft. The hydraulic system includes a hydraulic actuator that is operatively coupled to a flight control member. An engine driven pump delivers hydraulic fluid to the actuator at a first pressure, and a boost pump delivers hydraulic fluid to the actuator at a second pressure that is higher than the first pressure. The hydraulic fluid returning from the actuator to the engine driven pump is delivered to the boost pump prior to reaching the engine driven pump.

In one aspect, the hydraulic system also includes a valve positioned upstream from the boost pump and movable between a first valve position in which the hydraulic fluid is delivered to the boost pump from just the engine driven pump and a second valve position in which the hydraulic fluid is delivered to the boost pump from a return line that leads away from the hydraulic actuator.

In one aspect, the hydraulic system also includes an accumulator positioned upstream from the valve to supply hydraulic fluid to the boost pump when the valve is in the second valve position.

In one aspect, wherein the valve is in the first valve position when a load demand at the actuator is below the first pressure and the second valve position when the load demand is above the first pressure.

In one aspect, the hydraulic system also includes a first pressure sensor that detects a pressure of the hydraulic fluid at an outlet of the boost pump and a second pressure sensor that detects a pressure of the hydraulic fluid in the actuator.

In one aspect, the hydraulic system also includes a return line that extends between the actuator and the engine driven pump to deliver the hydraulic fluid from the actuator to the engine driven pump, and a spare line that extends between the return line and the boost pump to deliver the hydraulic fluid that is returning towards the engine driven pump to the boost pump.

In one aspect, the hydraulic system also includes a reservoir positioned along the return line between the engine driven pump and the spare line with the reservoir configured to hold hydraulic fluid that has moved along the return line prior to being moved to the engine driven pump.

In one aspect, the boost pump is an axial piston pump that includes an adjustable swashplate to control the pressure of the hydraulic fluid that is supplied by the boost pump.

In one aspect, the hydraulic system also includes a valve positioned upstream from the boost pump and movable between a first valve position in which the hydraulic fluid is delivered to the boost pump from the engine driven pump and a second valve position in which the hydraulic fluid is delivered to the boost pump from a return line that leads away from the hydraulic actuator.

One aspect is directed to a hydraulic system for an aircraft. The hydraulic system includes an engine driven pump that delivers hydraulic fluid at a first pressure, a hydraulic actuator, a supply line through which the hydraulic fluid is delivered from the engine driven pump to the hydraulic actuator, a boost pump that delivers the hydraulic fluid to the actuator at a second pressure that is higher than the first pressure, a return line that returns the hydraulic fluid from the actuator to the engine driven pump, and a spare line that extends between the return line and the boost pump with the spare line positioned along the return line upstream from the engine driven pump. At least a portion of the time the hydraulic fluid that is supplied to the boost pump includes the hydraulic fluid that is returning along the return line from the actuator towards the engine driven pump.

In one aspect, the hydraulic system also includes a boost line that extends between the boost pump and the actuator to deliver the hydraulic fluid from the boost pump to the actuator with the boost line being different than the supply line.

In one aspect, the hydraulic system also includes an accumulator positioned upstream from the boost pump to supply hydraulic fluid to the boost pump.

In one aspect, the hydraulic system also includes a valve positioned upstream of the boost pump and configured between a first valve position in which hydraulic fluid is delivered to the boost pump from just the engine driven pump and a second valve position in which the hydraulic fluid is delivered to the boost pump from the spare line.

In one aspect, the boost pump is an axial piston pump that includes an adjustable swashplate to control the pressure of the hydraulic fluid that is supplied by the boost pump.

One aspect is directed to a method of operating a hydraulic system of an aircraft. The method includes supplying hydraulic fluid at a first pressure from an engine driven pump to an actuator with the actuator being operatively connected to a flight control member. The method includes returning the hydraulic fluid from the actuator to the engine driven pump along a return line. The method includes in response to the load pressure demand at the actuator, supplying hydraulic fluid to the actuator from a boost pump at an elevated pressure that is above the first pressure. The method includes in response to the load pressure demand, supplying the hydraulic fluid to the boost pump from the return line prior to the hydraulic fluid being returned to the engine driven pump.

In one aspect, the method also includes in response to the load pressure demand, supplying hydraulic fluid to the boost pump from an accumulator positioned upstream from the boost pump.

In one aspect, the method also includes in response to the load pressure demand, continuing to supply hydraulic fluid to the boost pump from the engine driven pump.

In one aspect, the method also includes supplying the boost pump with hydraulic fluid that is supplied from the engine driven pump when the load demand is below a predetermined amount and supplying the boost pump with hydraulic fluid from each of an accumulator and the return line in response when the load demand is above the predetermined amount.

In one aspect, the method also includes adjusting an angular position of a swashplate in the boost pump and adjusting the pressure of the hydraulic fluid supplied to the actuator from the boost pump.

In one aspect, the method also includes changing a shuttle valve from a first valve position, based on the pressure of the hydraulic fluid at the valve, to a second valve position when the system pressure is below a predetermined pressure.

DETAILED DESCRIPTION

The present disclosure is directed to methods and devices for a hydraulic system for an aircraft. The hydraulic system can include a hydraulic actuator that is operatively coupled to a flight control member. Hydraulic fluid is moved through the hydraulic system by an engine driven pump that delivers hydraulic fluid to the actuator at a first pressure, and a boost pump that delivers hydraulic fluid to the actuator at a second pressure that is higher than the first pressure. The hydraulic system is configured such that the hydraulic fluid returning from the actuator to the engine driven pump can be delivered to the boost pump prior to reaching the engine driven pump.

Figure 1:
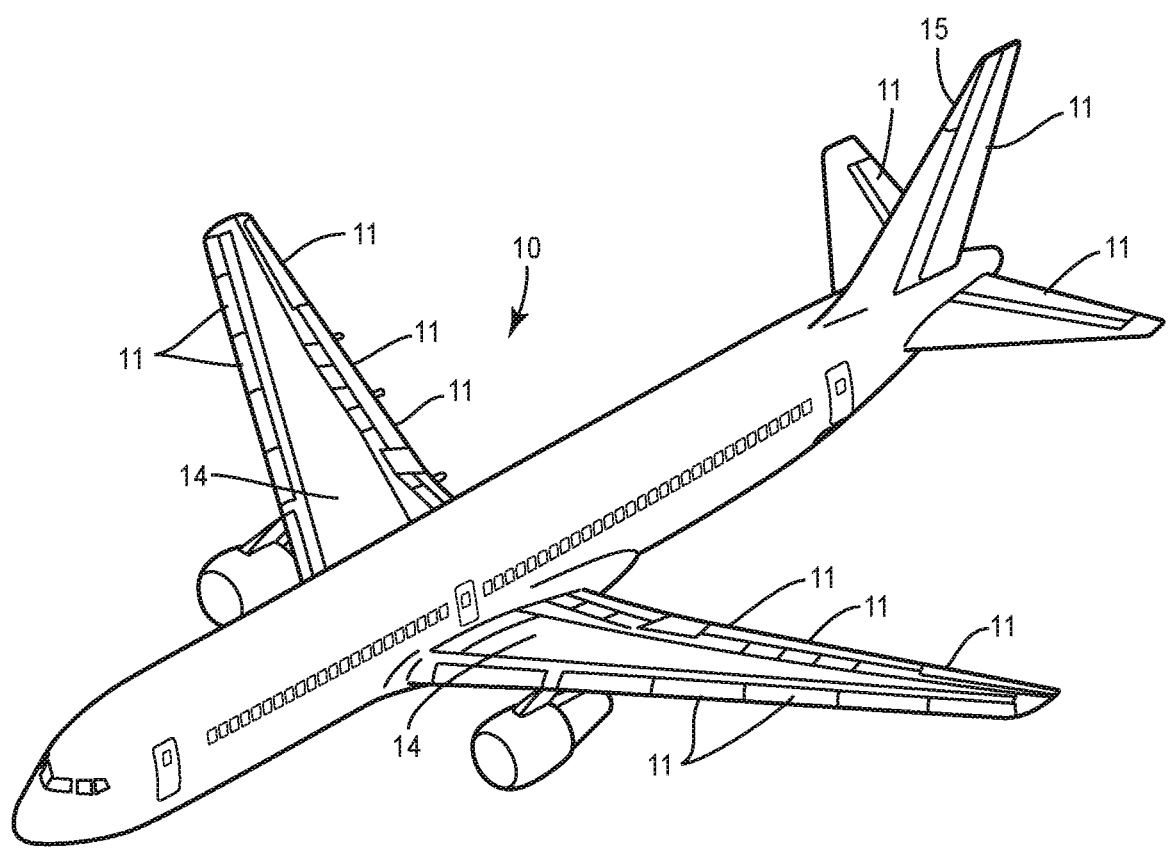
FIG. 1 is a perspective view of an aircraft.
Figure 2:
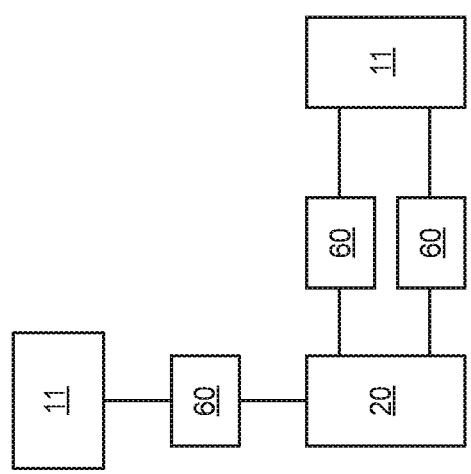
FIG. 2 is a schematic view of a hydraulic system and actuators that move flight control members.

An aircraft 10 can include one or more flight control members 11. As illustrated in FIG. 1, flight control members 11 can be positioned at various locations on the aircraft includes the wings 14 and tail 15 and include but are not limited to a rudder, elevators, ailerons, wing leading and trailing edge devices, and spoilers. The flight control members 11 are movably attached to the aircraft 10 to change their orientation to control the flight. As illustrated in FIG. 2, one or more actuators 60 are connected to the flight control members 11 to control the orientation relative to the remainder of the aircraft 10. A hydraulic system 20 supplies hydraulic fluid to first and second chambers 61, 62 of the actuators 60 to adjust the orientation of the flight control members 11. Prior to reaching the actuators 60, the hydraulic fluid moves through a pair of 4-way valves 70 that control the flow into and out of the chambers 61, 62.

Figure 3:
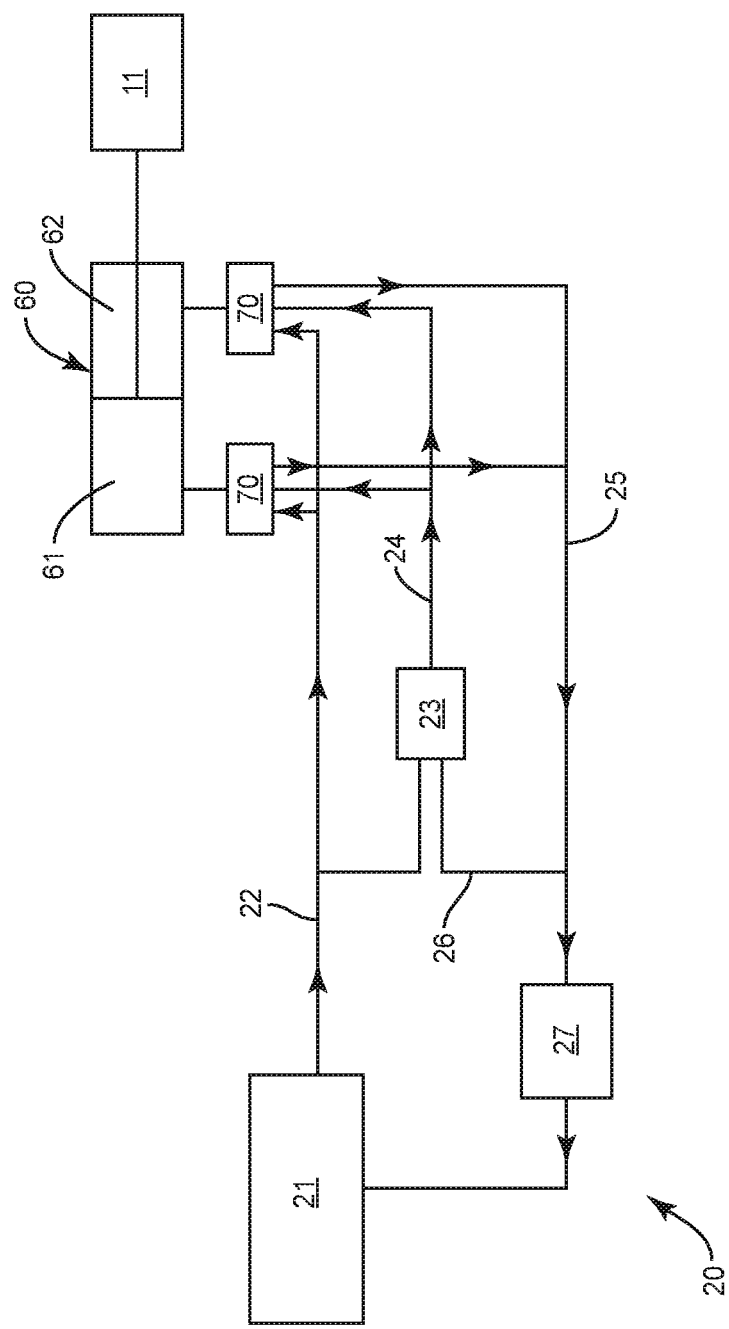
FIG. 3 is a schematic diagram of a hydraulic system that supplies hydraulic fluid to and from an actuator.

FIG. 3 illustrates an overview of a hydraulic system 20 that supplies hydraulic fluid to the actuators 60. Although FIG. 3 includes a single actuator 60, the hydraulic system 20 is capable of supplying hydraulic fluid to multiple actuators 60. The hydraulic system 20 includes an engine driven pump 21 that supplies the hydraulic fluid at a supply pressure through a supply line 22 to the actuators 60. The engine driven pump 21 can supply the hydraulic fluid at a variety of different pressures. One specific design includes a system pressure of 1200 psi.

A boost pump 23 can supply hydraulic fluid at an elevated pressure to the actuators 60. The boost pump 23 can be necessary to supply the hydraulic fluid when the hydraulic fluid supplied by the engine driven pump 21 falls below a predetermined pressure. The boost pump 23 is able to supply hydraulic fluid at a variety of pressures. One design includes supplying hydraulic fluid at a pressure of 3000 psi.

A boost line 24 extends between the boost pump 23 and the valves 70 to supply the boosted hydraulic fluid. A return line 25 moves the hydraulic fluid from the actuators 60 and the valves 70. The return line 25 leads to a reservoir 27 where the hydraulic fluid can be stored and cooled before being re-supplied to the engine driven pump 21. A spare line 26 extends from the return line 25 and leads to the boost pump 23. In the event an inadequate amount of hydraulic fluid is available at the boost pump 23, returning hydraulic fluid can be supplied to the boost pump 23 before it is moved along the return line 25 to the reservoir 27.

The boost pump 23 is positioned along the hydraulic system 20 away from the engine driven pump 21. This distributed architecture can provide for more responsiveness as hydraulic fluid at an elevated pressure can be supplied to the actuators 60 in less time. The distributed architecture also allows for hydraulic fluid from the actuators 60 to bypass a portion of the return line 25 and be directed to the boost pump 23. This feature saves energy loss due to a pressure drop in the return line 25 that routes the hydraulic fluid back to the engine driven pump 21. The supply line 22 from the engine driven pump 21 can also be reduced in size to save weight since at high flow rates the engine driven pump 21 is not responsible for providing hydraulic fluid.

Figure 4:
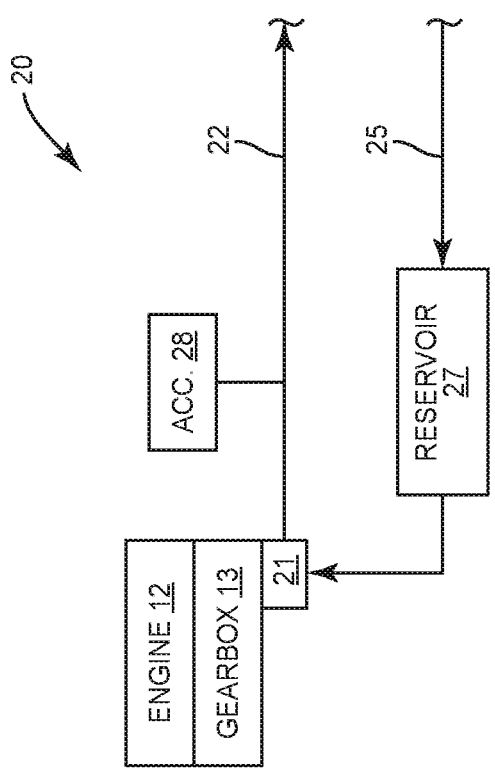
FIG. 4 is a partial schematic view of a portion of a hydraulic system.

FIG. 4 illustrates a section of a hydraulic circuit 20 that includes the engine driven pump 21 positioned at an engine 12 of the aircraft 10. Mechanical power generated by the engine 12 is converted into hydraulic or electrical power for distribution about the aircraft 10. A gearbox 13 can integrate or couple the engine 12 to the engine driven pump 21. The gearbox 13 can also integrate or couple the engine 12 to an electric generator and/or environmental control system (not illustrated). The engine driven pump 21 converts mechanical power provided by the engine 12 into hydraulic power for distribution about the hydraulic system 20.

An accumulator 28 can be connected to the supply line 22 downstream from the engine driven pump 21 to supply additional hydraulic fluid for use in the hydraulic system 20.

The accumulator 28 can supply hydraulic fluid in certain circumstances, such as but not limited to when a volume of hydraulic fluid moving along the supply line 22 drops below a predetermined level or when a pressure of the hydraulic fluid in the supply line 22 is below a predetermined level.

The reservoir 27 is positioned along the return line 25 upstream from the engine driven pump 21. The reservoir 27 stores the hydraulic fluid at a working pressure and can also provide for cooling the hydraulic fluid prior to being re-introduced back to the engine driven pump 21.

The aircraft 10 can include multiple hydraulic systems 20 to control the movement of the various flight control members 11. This can include a first hydraulic system 20 that extends along a first portion of the aircraft (e.g., starboard side). The first hydraulic system 20 includes an engine driven pump 21 that is driven by a first engine (e.g., a starboard engine). A second hydraulic system 20 can be positioned on a second portion of the aircraft and include a separate engine driven pump 21 that is driven by a different engine. The number of hydraulic systems 20 in an aircraft 10 can vary. Further, the engines 12 can drive different numbers of engine driven pumps 21. For example, an aircraft 10 can include four main engines, namely two left main engines and two main right engines. Each main engine can drive two engine driven pumps 21. Additionally, the aircraft 10 can include two hydraulic systems 20, where four engine driven pumps 21 associated with the left main engines 12 produce hydraulic power to a left hydraulic system 20 and four engine driven pumps 21 associated with the right main engines 12 produce hydraulic power to a right hydraulic system 20.

Figure 5:
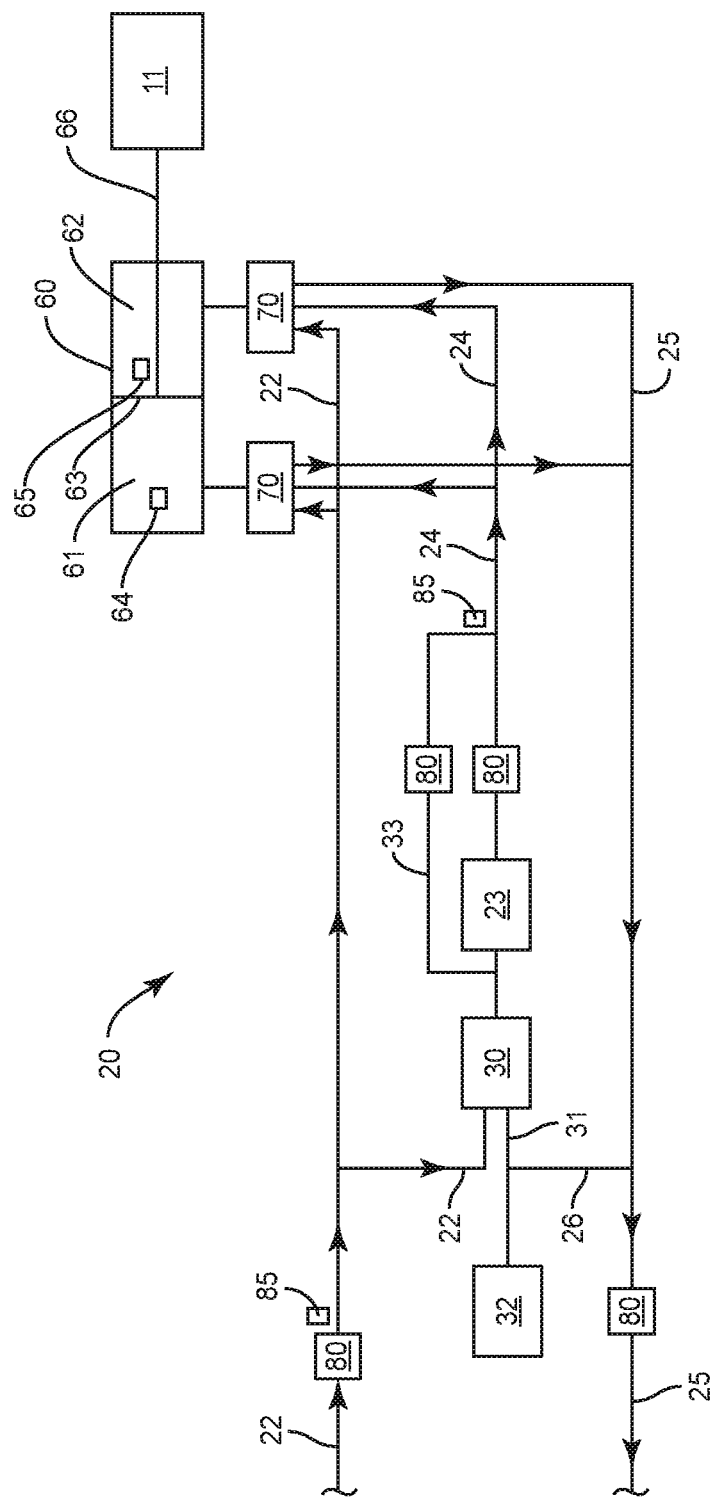
FIG. 5 is a partial schematic view of a portion of a hydraulic system and an actuator that receives hydraulic fluid from the hydraulic system.

FIG. 5 illustrates another section of the hydraulic system 20 that receives the hydraulic fluid along supply line 22 from the engine driven pump 21 and returns the hydraulic fluid back through the return line 25 to the reservoir 27. The supply line 22 leads to the valves 70 to supply hydraulic fluid at system pressure from the engine driven pump 21. The supply line 22 also branches and leads to the boost pump 23. One or more check valves 80 can be positioned along the supply line 22 to allow the hydraulic fluid to flow in the supply direction and prevent movement in the reverse direction (i.e., towards the engine drive pump 21).

Figure 6:
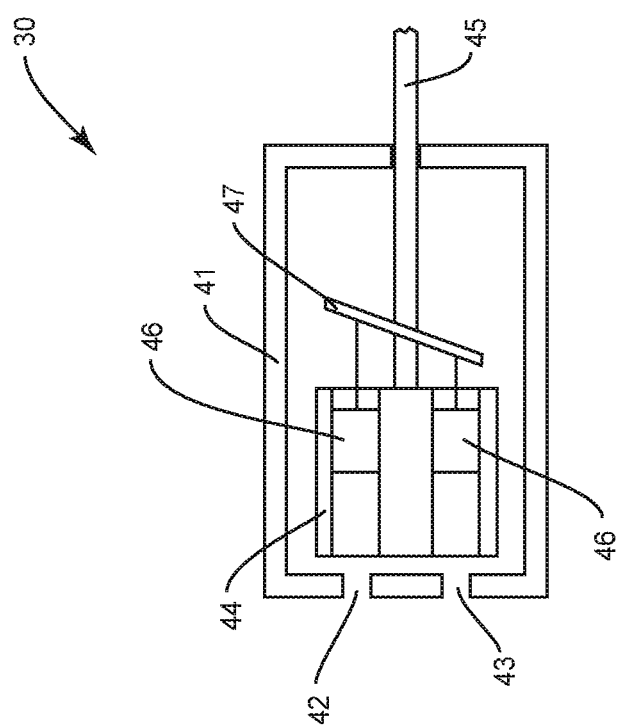
FIG. 6 is a schematic diagram of a hydraulic pump.

The boost pump 23 is configured to move hydraulic fluid at an elevated pressure through a boost line 24 to the valves 70. One type of hydraulic pump 21, 23 is an axial piston pump which can also be referred to as a swash-plate pump. FIG. 6 illustrates an axial piston pump 21, 23 that includes a housing 41 with an inlet 42 and an outlet 43. A block 44 is positioned within the housing 41 and rotates on a shaft 45. Pistons 46 are positioned within cylinders in the block 44 and are contact against a stationary swashplate 47. The swashplate 47 is positioned at an angle relative to the block 44. The pistons 46 extend outward from the block 44 and contact against the swashplate 47 during rotation of the block 44. The pistons 46 remain in contact with the swashplate 47 during the rotation resulting in a reciprocating motion that drives the hydraulic fluid through the outlet 43. The hydraulic pump 21, 23 can also include other hydraulic pumps that can move pressurized fluid through the supply lines 22, 24.

Figure 5A:
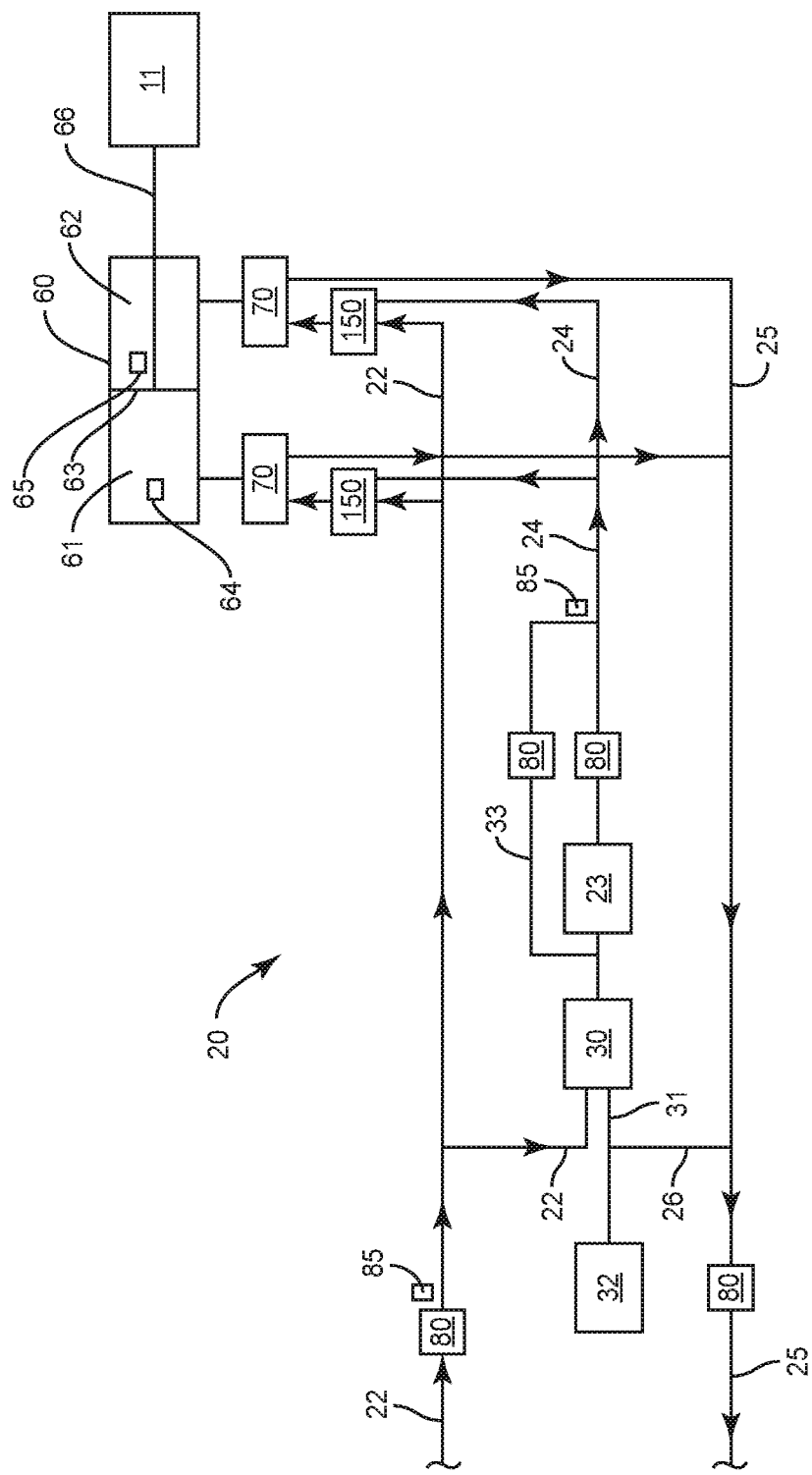
FIG. 5A is a partial schematic view of a portion of a hydraulic system with a manifold at each valve and an actuator that receives hydraulic fluid from the hydraulic system.

In one design as illustrated in FIG. 5A, the boost line 24 and the supply line 22 supplies hydraulic fluid to the valve 70. In one design, a manifold 150 can receive hydraulic fluid from both supply line 22 and boost line 24 and output a single supply line to the valve 70. The manifold 150 can be integrated with the valve 70 or can be positioned upstream from the valve 70. The manifold 150 can include check valves and/or shuttle valves. In one design, the check valves include different cracking pressures to avoid cross talk between the pumps 21, 23.

A valve 30 is positioned upstream from the boost pump 23 to control the source of hydraulic fluid that is supplied to the boost pump 23. The valve 30 can be a shuttle valve that is positionable between first and second valve positions based on the pressure of the hydraulic fluid at the valve 30. In the first valve position, the valve 30 passes hydraulic fluid from just the supply line 22 to the boost pump 23. In the second valve position, the valve 30 passes hydraulic fluid from just the spare line 26 and an accumulator 32 to the boost pump 23. The valve 30 can be a shuttle valve that is sprung from the first valve position to the second valve position to assure an adequate amount of hydraulic fluid is supplied to the boost pump 23.

The accumulator 32 is positioned upstream from the boost pump 23 and holds hydraulic fluid that can be supplied to the boost pump when the valve 30 is in the second valve position. The accumulator 32 assures the spare line 26 provides adequate flow of hydraulic fluid when the valve 30 is in the second valve position. The close proximity of the accumulator 32 to the boost pump 23 provides for an efficient supply of hydraulic fluid as little pressure is lost while the hydraulic fluid moves from the accumulator 32 to the boost pump 23.

A check valve 80 is positioned along the return line 25 downstream from the spare line 26 to protect against pulling fluid from this downstream section of the return line 25. This isolation adds robustness to the distributed hydraulic circuit 20 when it is attached to another hydraulic system, such as a central circuit that protects both circuits from unnecessary coupling. The check valve 80 assures that the hydraulic fluid in the return line 25 downstream from the spare line 26 does not move the wrong direction.

A bypass line 33 extends around the boost pump 23. In the event of failure of the boost pump 23, hydraulic fluid can be supplied to the boost line 24 through the bypass line 33. Check valves 80 are positioned along both the bypass line 33 and the line immediately downstream from the boost pump 23 to prevent the hydraulic fluid from flow in the wrong direction during periods of differing pressure differentials among the different sections of the hydraulic circuit 20.

The actuator 60 includes first and second chambers 61, 62 that are separated by a piston 63. A rod 66 extends from the piston 63 and is attached to the flight control member 11. Hydraulic fluid is introduced and removed from each of the first and second chambers 61, 62 to control the movement of the piston 63 and rod 66 and the connected flight control member 11.

Sensors are positioned to detect the pressure of the hydraulic fluid at various locations around the hydraulic system 20. Sensor 64 is positioned in the first chamber 61 to sense the pressure of the hydraulic fluid. Likewise, sensor 65 is positioned to sense the pressure in the second chamber 62. A sensor 85 is positioned downstream from the boost pump 23 to detect the pressure of the hydraulic fluid being fed into the boost line 24. A sensor 85 can also be positioned along the supply line 22 to determine the pressure of the hydraulic fluid from the engine driven pump 21. Various types of sensors 64, 65, 85 can be used, including but not limited to pressure transducers.

Figure 7:
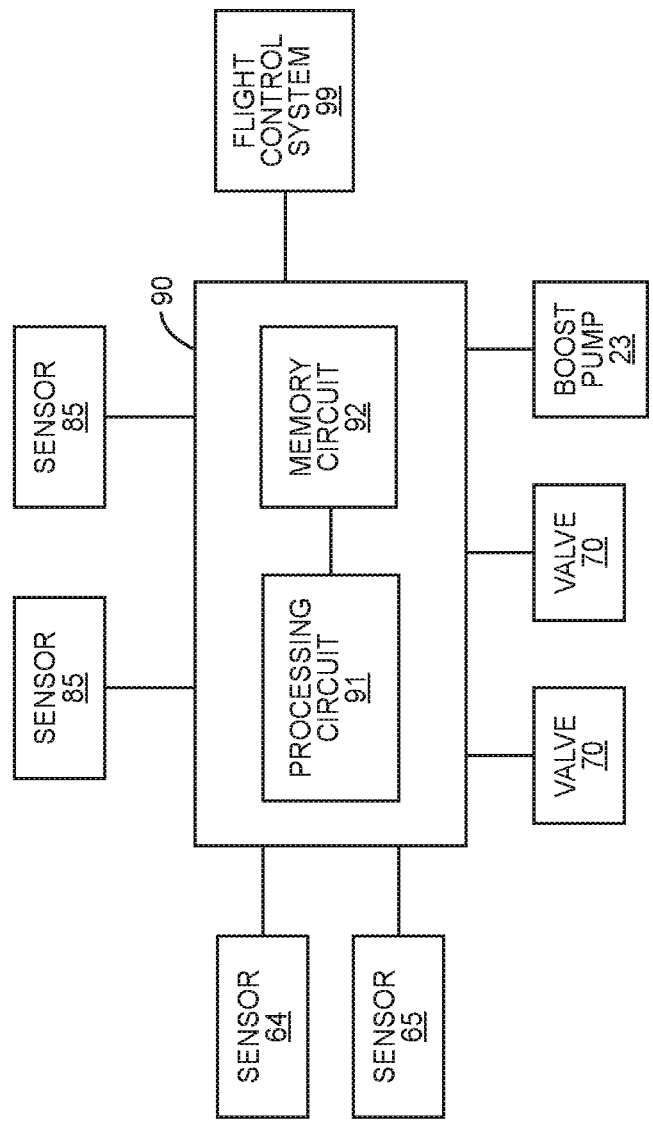
FIG. 7 is a schematic diagram of an actuation control unit.

An actuation control unit 90 can control the movement of hydraulic fluid through the hydraulic system 20. FIG. 7 illustrates an actuation control unit 90 that includes one or more processing circuits (shown as processing circuit 91) that may include one or more microprocessors, Application Specific Integrated Circuits (ASICs), or the like, configured with appropriate software and/or firmware. A computer readable storage medium (shown as memory circuit 92) stores data and computer readable program code that configures the processing circuit 91 to implement the techniques described above. Memory circuit 92 is a non-transitory computer readable medium, and may include various memory devices such as random access memory, read-only memory, and flash memory.

The actuation control unit 90 can receive signals from the sensors 64, 65, 85 positioned along the hydraulic system 20. The actuation control unit 90 can communicate with a flight control system 99 that controls one or more functions of the aircraft 10. The flight control system 99 can provide various data to the actuation control unit 90, such as but not limited to the commanded movements of the flight control member 11.

The actuation control unit 90 controls the movement of the hydraulic fluid through the hydraulic system 20 to position the flight control member 11 in its commanded position. The actuation control unit 90 uses inputs from the sensors 64, 65, 85 to control the boost pump 23 and valves 70 to supply the needed hydraulic fluid.

Figure 8:
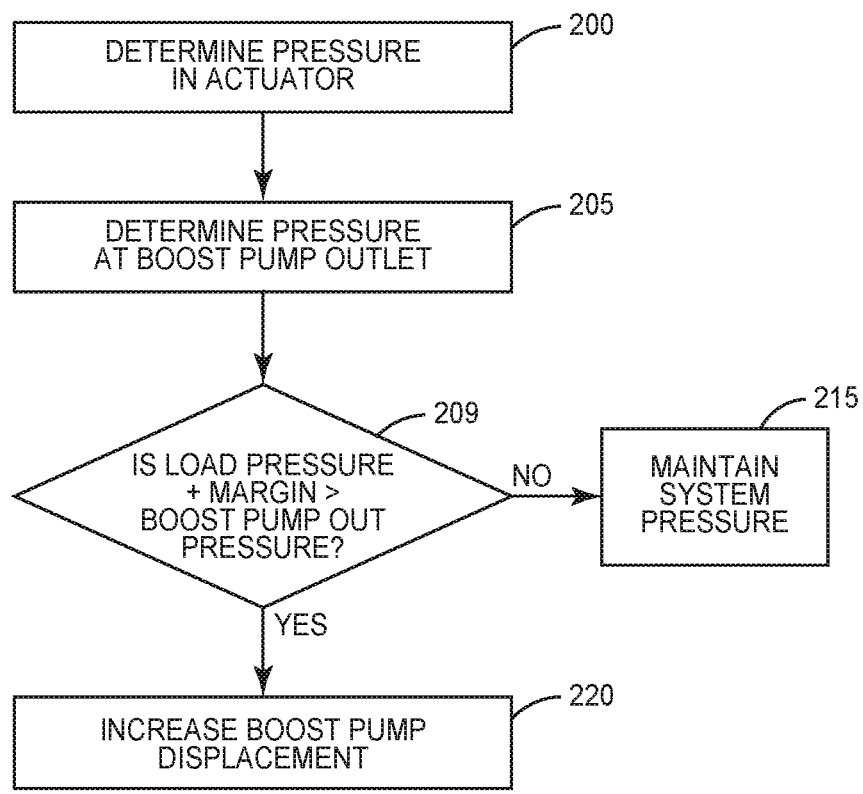
FIG. 8 is a flowchart diagram of a method of operating a hydraulic system of an aircraft.

FIG. 8 illustrates a method of controlling fluid supply through the hydraulic system 20. The hydraulic fluid in the hydraulic system 20 is initially supplied by the engine driven pump 21 and the boost pump 23 is controlled at zero displacement.

The actuation control unit 90 determines the load pressure of the hydraulic fluid in the actuator 60 (block 200). This can include determining the pressure of the hydraulic fluid in one or both of the first and second chambers 61, 62. The actuation control unit 90 also determines the pressure of the hydraulic fluid at the outlet of the boost pump 23 (block 205).

The actuation control unit 90 then determines whether the system pressure being supplied by the engine driven pump 21 is adequate for the present needs of the actuator 60. The actuation control unit 90 determines whether the load pressure at the actuator 60 plus a margin is greater than the pressure of the hydraulic fluid at the boost pump outlet (block 209). With the boost pump 23 having zero displacement, the pressure of the hydraulic fluid at the boost pump outlet is the system pressure.

When the load pressure at the actuator 60 plus the margin is not greater than the pressure at the boost pump outlet, the actuation control unit 90 continues to supply the hydraulic fluid at the system pressure that is supplied by the engine driven pump 21 (block 215). The hydraulic fluid at the system pressure is adequate to accommodate the load that is being placed on the actuator 60 through the flight control member 11. The boost pump 23 continues to be controlled at zero displacement.

When the load pressure and margin at the actuator 60 is greater than the pressure at the boost pump outlet, the actuation control unit 90 increases the boost pump displacement (block 220). This increases the pressure of the hydraulic fluid supplied to the actuator 60 to meet the load demand to move the flight control member 11 to the commanded position. The actuation control unit 90 can increase the boost pump 23 a predetermined amount once the need for additional pressure is determined. The actuation control unit 90 can also increase the boost pump 23 output an amount dependent upon the extent of the need at the actuator 60 dependent upon the load that is being placed on the actuator 60.

As described above, a margin can be added to the load pressure before the output of the boost pump 23 is increased. The size of the margin can vary.

The valve 30 upstream from the boost pump 23 is in a first valve position when the system pressure is used for the actuator 60. The first valve position provides for the hydraulic fluid to be supplied just through the supply line 22 from the engine driven pump 21. The valve 30 is in a second valve position when the boost pump 23 increases displacement above zero to supply elevated pressure to the actuator 60. In the second valve position, hydraulic fluid is supplied to the boost pump 23 from just the spare line 26 and the accumulator 32.

In another embodiment, when the valve 30 is in the second valve position, hydraulic fluid can also be supplied to the boost pump 23 from the supply line 22 in addition to the accumulator 32 and the spare line 26.

The valve 30 is configured to move from the first valve position to the second valve position when the system pressure supplied by engine driven pump 21 drops below a predetermined level. By using flow that would otherwise return to the engine driven pump 21, energy is saved because the engine driven pump 21 no longer has to bring that portion of the return flow which is bypassed to the spare line 26 to the engine driven pump outlet pressure. This feature also saves energy loss due to pressure drop in the return line 25 that routes from back to the engine driven pump 21. The supply line 22 from the engine driven pump 21 can also be reduced in size to save weight since hydraulic fluid at elevated pressures are not moved through this section of the supply line 22.

The accumulator 32 is employed at the valve 30 to assure the spare line 26 provides adequate hydraulic fluid when the valve 30 is in the second valve position. The accumulator 32 provides hydraulic fluid to the boost pump 23 in an efficient manner since it is very close to the boost pump 23 and therefore loses little hydraulic pressure in the line to the boost pump 23.

Figure 9:
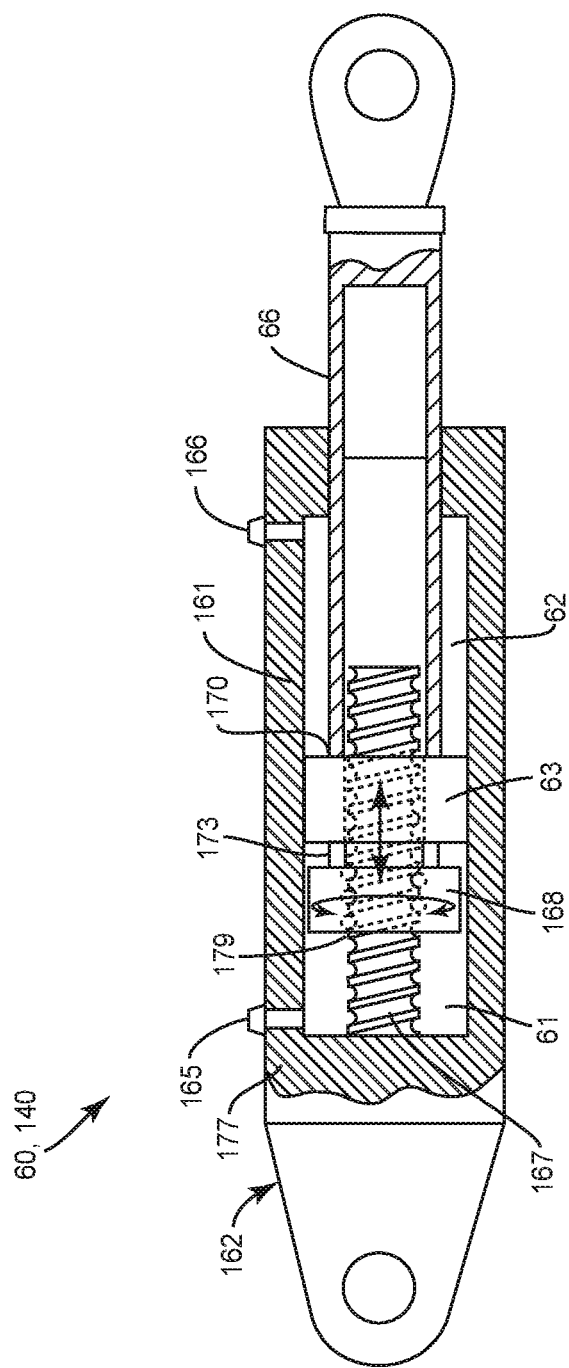
FIG. 9 is a schematic section view of an actuator.
Figure 10:
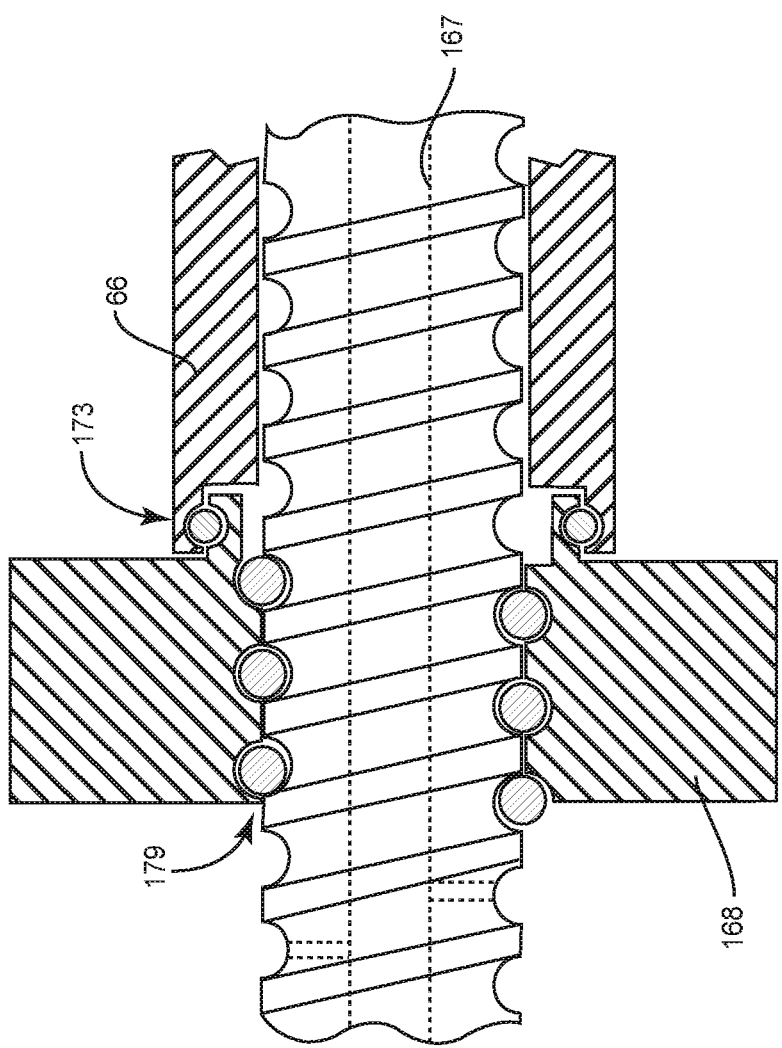
FIG. 10 is a magnified view of a section of the actuator of FIG. 9.

A variety of different hydraulic actuators 60 can be used to move the flight control members 11. One actuator 60 includes an integrated inerter 140 as illustrated in FIGS. 9 and 10. The actuator 60 includes a first terminal 162 that includes a housing 161, and a second terminal 163 that includes the rod 69. Each of the first and second terminals 162, 163 can be configured to attached to either a structural members in the aircraft 10 or the flight control member 11. The housing 161 extends around and encloses the first and second chambers 61, 62. The first chamber 61 includes a port 165 and the second chamber 62 includes a port 166. The ports 165, 166 provide for the hydraulic fluid to flow into and out of each of the first and second chambers 61, 62. A threaded shaft 167 extends outward from an end wall 177 and into the first chamber 61. A flywheel 168 is threaded onto the threaded shaft 167 and is movable by relative rotation along the length. The flywheel 168 rotates in proportion to an axial rate of the rod 66 that extends through an opening in an end wall of the housing 161. The rod 66 includes an inner end 170 that is hollow and extends around the threaded shaft 167.

The piston 63 is mounted to the inner end of the rod 66. The piston 63 includes an outer diameter that substantially matches the inner diameter of the first and second chambers 61, 62. A seal (not illustrated) such as an O-ring can extend around the outer perimeter of the piston 63 to seal against the wall of the first and second chambers 61, 62. The piston 63 is axially slidable within the chambers 61, 62. The piston 63 can provide for an unbalanced setting with one of the sides of the piston 63 having a greater cross-sectional area than the opposite piston side. The piston can also be balanced with the opposing sides have the same cross-sectional area. The piston 63 also includes an inner opening that extends around the shaft 167.

The flywheel 168 is mounted in the first chamber 61 and is rotatably coupled to the piston 63 at a flywheel annulus 179. The flywheel 168 is configured to rotationally accelerate in proportion to axial acceleration of the piston 63 and piston rod 66 relative to the shaft 167. A bearing 173 can be positioned along the shaft 167 between the flywheel 168 and the piston 63.

FIG. 10 illustrates a magnified sectional view of FIG. 9 illustrating the flywheel 168 coupled to the rod 66 at the flywheel annulus 179. The flywheel annulus 179 is also threadably engaged to the shaft 167. The shaft 167 can be configured as a ball screw with helical grooves for receiving ball bearings which couple similarly-configured helical grooves in the flywheel annulus 179 to the ball screw with minimal friction. Although not illustrated, the flywheel annulus 179 can include a ball nut for circulating the ball bearings coupling the flywheel 168 to the ball screw. In another example not shown, the threaded shaft 167 can include a lead screw with threads to which the flywheel annulus 179 is directly engaged. The flywheel 168 can be configured for engagement to any one of a variety of different types of configurations of threaded shafts, and is not limited to the ball screw.

FIG. 10 also illustrates a bearing 173 for coupling the flywheel annulus 179 to the rod 66 such that the rod 66 and flywheel 168 can translate in unison as the flywheel 168 rotates due to threadable engagement with the threaded shaft 167. Although the bearing 173 is shown as a bearing, the bearing 173 can be provided in any one a variety of different configurations capable of axially coupling the flywheel 168 to the rod 66 with a minimal amount of axial free play. For example, the bearing 173 can be configured as a roller bearing (not shown). In still further examples, the flywheel 168 can be coupled to the rod 66 without a bearing while still allowing the flywheel 168 to rotate during translation of the rod 66 and flywheel 168 relative to the threaded shaft 167.

Figure 11:
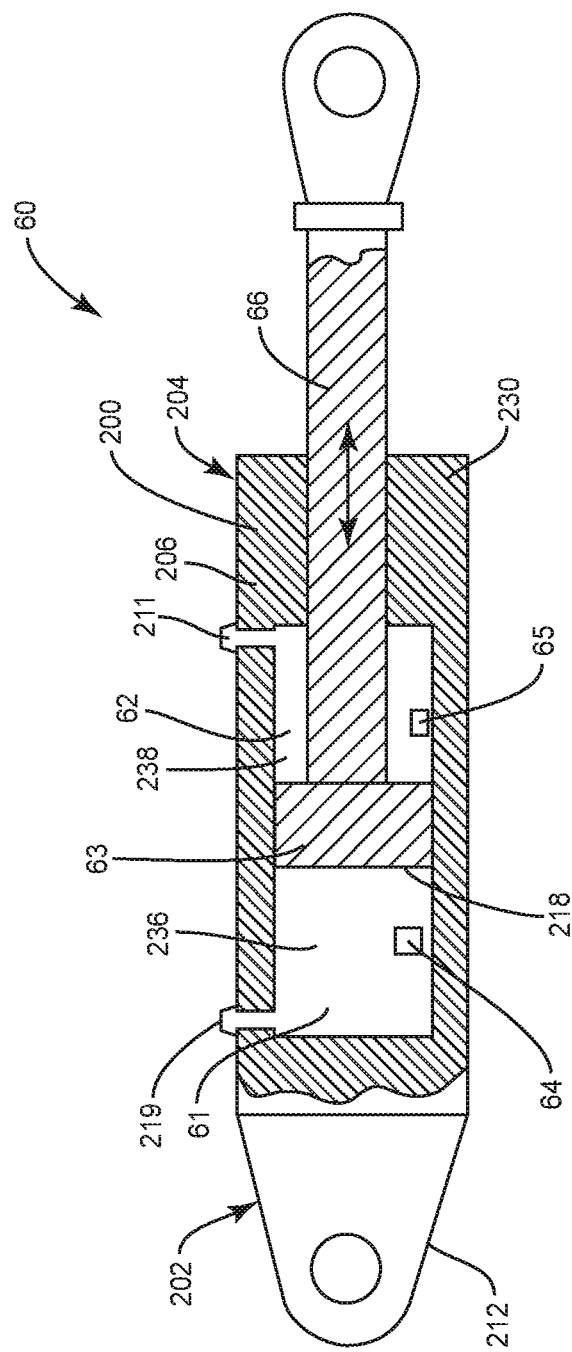
FIG. 11 is a schematic sectional view of an actuator.

FIG. 11 illustrates an actuator 60 that can extend between a support member and a flight control member 11. The actuator 60 includes a housing 200 that extends around and forms an interior chamber. The piston 63 extends across and divides the chamber into the first chamber 61 and the second chamber 62. A first port 219 leads into the first chamber 61 and a second port 211 leads into the second chamber 62.

Figure 12:
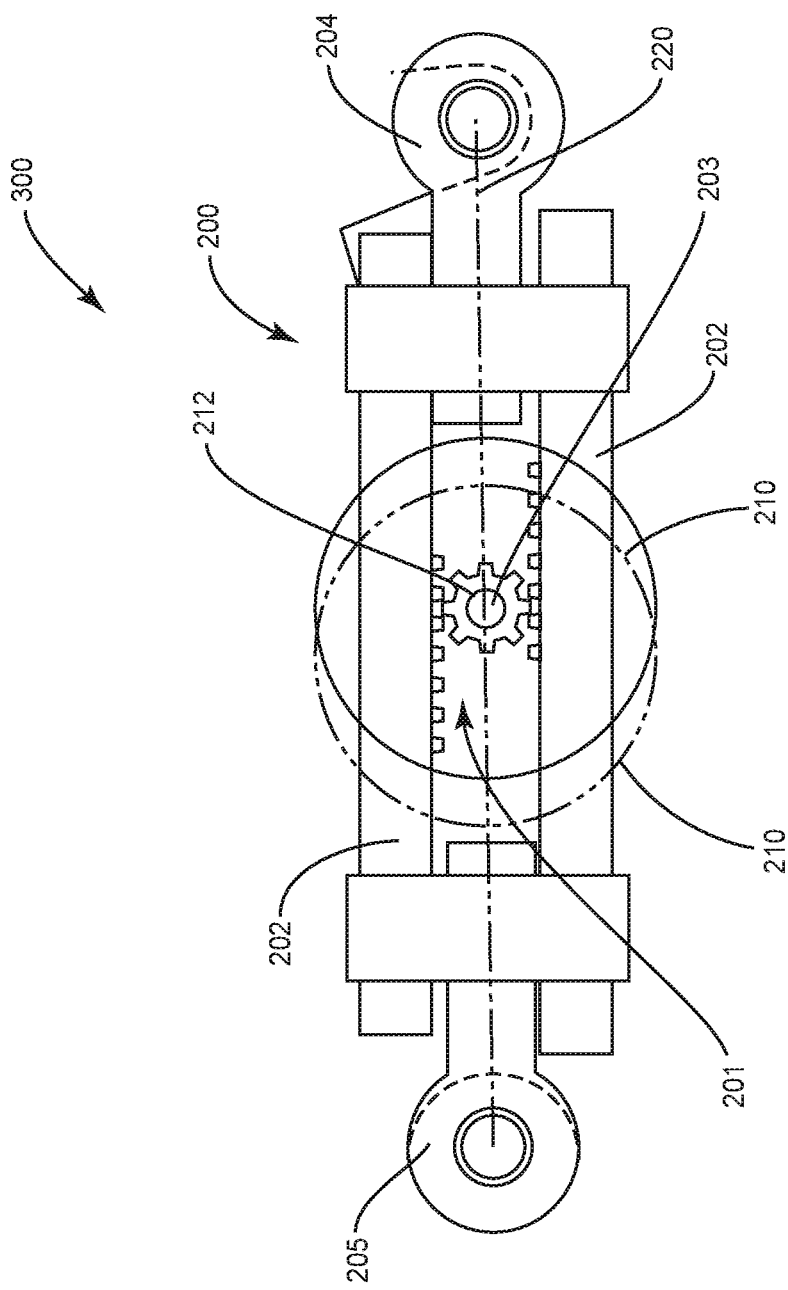
FIG. 12 is a schematic side view of an inerter that can be attached to a flight control member.

An inerter can also be attached to the flight control member 11 in combination with an actuator 60 to dampen the flight control member 11. FIGS. 9 and 10 include an inerter that is integrated with the actuator 60. FIG. 12 illustrates another inerter 300 that includes a dual rack and pinion structure with a circular pinion that engages two linear gear racks. Rotational motion applied to the pinion causes the racks to move relative to each other and relative to the pinion, thus translating the rotational motion of the pinion into linear motion.

The inerter 300 includes a flexible holding structure 200 and a dual rack and pinion assembly 201 held or clamped by and between the flexible holding structure 200. The dual rack and pinion assembly 201 includes dual racks 202 positioned opposite each other and substantially housed within and held or clamped by the flexible holding structure 200. The racks 202 include a first rack and a second rack that each have teeth. The dual rack and pinion assembly 201 also includes a pinion 203, such as in the form of a pinion gear, engaged to and between the first and second racks 202. The pinion 203 has gear teeth configured to engage the teeth of the first and second racks 202. A first terminal 204 is coupled to the first rack 202 and a second terminal 205 is coupled to the second rack 202.

The inerter 300 also includes a pair of inertia wheels 210. The inertia wheels 210 are each respectively positioned adjacent to opposite exterior sides of the flexible holding structure 200. An axle element 212 extends through the first inertia wheel 210, the flexible holding structure 200, the pinion 203, and the second inertia wheel 210. Movement of the flight control member 11 (that is mounted to one of the terminals 204, 205) causes translational movement of the first rack 202 relative to the second rack 202, along a longitudinal inerter axis 220 which causes the rotational movement of the pinion 203 and the pair of inertia wheels 210 such that the rotational movement of the pinion 203 is resisted by the pair of inertia wheels 210 and there is no incidental motion. This results in the dual rack and pinion assembly 201 damping movement of the flight control member 11.

The motion of the pinion 203 is resisted by the inertia wheels 210 such that the change of orientation of the racks 202 are just in relation to the longitudinal inerter axis 220 by inducing a resistance force to the rotation of the first terminal 204 connected to the flight control member 11. The resistance force is resisted by the inertia wheels 210. Damping movement of the flight control member 11 provides increased flutter suppression. This can result in an improved hydraulic application stability and an increased efficient flight control actuation by the actuator 60.

The actuator 60 with the integrated inerter 140 provides benefits that conventional actuator systems do not provide, or are not capable of providing. For example, the actuator 60 of the present aspects creates or contributes to a system that beneficially allows for significant savings in the power consumption of the aircraft 10 by increasing the damping of the actuator 60 that permits reduced actuator piston area and reduced flow proportional to the area reduction. Such reductions allow the hydraulic system 20 to provide hydraulic fluid at reduced flow rate. Additionally, because the actuator 60 of the present disclosure controls flutter, fewer hydraulic actuators 60 are needed on aircraft 10 thereby requiring less power to be generated by the engines 12 of the aircraft 10.

The hydraulic system 20 and methods controlling a position of a flight control member 11 can be used with a variety of aircraft 10. One aircraft includes a commercial aircraft that includes rows of seats each configured to accommodate a passenger. Other aircraft 10 include but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:
1. A hydraulic system for an aircraft, the hydraulic system comprising:

a hydraulic actuator that is operatively coupled to a flight control member;

an engine driven pump that delivers hydraulic fluid to the actuator at a first pressure; and a boost pump that delivers hydraulic fluid to the actuator at a second pressure that is higher than the first pressure;

a valve positioned upstream from the boost pump and movable between a first valve position in which hydraulic fluid is delivered to the boost pump from the engine driven pump and a second valve position in which hydraulic fluid is delivered to the boost pump from a return line that leads away from the hydraulic actuator; and wherein hydraulic fluid returning from the actuator to the engine driven pump is delivered to the boost pump prior to reaching the engine driven pump.

2. The hydraulic system of claim 1, wherein in the first valve position the hydraulic fluid is delivered to the boost pump from just the engine driven pump.

3. The hydraulic system of claim 1, further comprising an accumulator positioned upstream from the valve to supply hydraulic fluid to the boost pump when the valve is in the second valve position.

4. The hydraulic system of claim 1, wherein the valve is at the first valve position when a load demand at the actuator is below the first pressure and at the second valve position when the load demand is above the first pressure.

5. The hydraulic system of claim 3, further comprising a first pressure sensor that detects pressure of the hydraulic fluid at an outlet of the boost pump and one or more second pressure sensors that detects pressure of the hydraulic fluid in the actuator.

6. The hydraulic system of claim 1, further comprising a return line that extends between the actuator and the engine driven pump to deliver the hydraulic fluid from the actuator to the engine driven pump, and a spare line that extends between the return line and the boost pump to deliver the hydraulic fluid that is returning towards the engine driven pump to the boost pump.

7. The hydraulic system of claim 6, further comprising a reservoir positioned along the return line between the engine driven pump and the spare line, the reservoir holds hydraulic fluid that has moved along the return line prior to being moved to the engine driven pump.

8. The hydraulic system of claim 1, wherein the boost pump is an axial piston pump that includes an adjustable swashplate to control a pressure of the hydraulic fluid that is supplied by the boost pump.

9. A hydraulic system for an aircraft, the hydraulic system comprising:

an engine driven pump that delivers hydraulic fluid at a first pressure;

a hydraulic actuator;

a supply line through which the hydraulic fluid is delivered from the engine driven pump to the hydraulic actuator;

a boost pump that delivers the hydraulic fluid to the actuator at a second pressure that is higher than the first pressure;

a return line that returns the hydraulic fluid from the actuator to the engine driven pump; and a spare line that extends between the return line and the boost pump, the spare line positioned along the return line upstream from the engine driven pump;

wherein at least a portion of the time the hydraulic fluid that is supplied to the boost pump comprises the hydraulic fluid that is returning along the return line from the actuator towards the engine driven pump.

10. The hydraulic system of claim 9, further comprising a boost line that extends between the boost pump and the actuator to deliver the hydraulic fluid from the boost pump to the actuator, the boost line being different than the supply line.

11. The hydraulic system of claim 9, further comprising an accumulator positioned upstream from the boost pump to supply hydraulic fluid to the boost pump.

12. The hydraulic system of claim 9, further comprising a valve positioned upstream of the boost pump and configured between a first valve position in which hydraulic fluid is delivered to the boost pump from just the engine driven pump and a second valve position in which the hydraulic fluid is delivered to the boost pump from the spare line.

13. The hydraulic system of claim 9, wherein the boost pump is an axial piston pump that includes an adjustable swashplate to control a pressure of the hydraulic fluid is supplied by the boost pump.

14. A method of operating a hydraulic system of an aircraft, the method comprising:

supplying hydraulic fluid at a first pressure from an engine driven pump to an actuator without the hydraulic fluid being supplied with a boost pump with the actuator being operatively connected to a flight control member;

returning the hydraulic fluid from the actuator to the engine driven pump along a return line;

in response to a load pressure demand, supplying hydraulic fluid to the actuator from a boost pump at an elevated pressure that is above the first pressure; and in response to the load pressure demand, supplying at least a portion of the hydraulic fluid to the boost pump from the return line prior to the hydraulic fluid being returned to the engine driven pump.

15. The method of claim 14, further comprising in response to the load pressure demand, supplying hydraulic fluid to the boost pump from an accumulator positioned upstream from the boost pump.

16. The method of claim 15, further comprising in response to the load pressure demand, continuing to supply hydraulic fluid to the boost pump from the engine driven pump.

17. The method of claim 14, further comprising supplying the boost pump with hydraulic fluid that is supplied from just the engine driven pump when the load pressure demand is below a predetermined amount and supplying the boost pump with hydraulic fluid from just each of an accumulator and the return line in response to determining the load pressure demand is above the predetermined amount.

18. The method of claim 14, further comprising adjusting an angular position of a swashplate in the boost pump and adjusting a pressure of the hydraulic fluid supplied to the actuator from the boost pump.

19. The method of claim 14, further comprising changing a shuttle valve from a first valve position, based on the pressure of the hydraulic fluid at the shuttle valve, to a second valve position when the hydraulic system pressure is below a predetermined pressure at the actuator.

20. The method of claim 14, further comprising delivering hydraulic fluid to the actuator through a single input line that is supplied with hydraulic fluid from both the engine driven pump and the boost pump.

* * * * *